United States Patent [19]

Youmans

[11] 4,282,523

[45] Aug. 4, 1981

[54] METHOD AND APPARATUS FOR LOGGING INCLINED EARTH BOREHOLES

[75] Inventor: Arthur H. Youmans, Houston, Tex.

[73] Assignee: Dresser Industries, Inc., Dallas, Tex.

[21] Appl. No.: 31,245

[22] Filed: Apr. 18, 1979

Related U.S. Application Data

[63] Continuation-in-part of Ser. No. 847,962, Nov. 2, 1977, abandoned, which is a continuation-in-part of Ser. No. 838,686, Oct. 3, 1977, Pat. No. 4,109,521.

[51] Int. Cl.³ .............................................. G01V 1/40
[52] U.S. Cl. ..................................... 340/860; 73/151.5
[58] Field of Search ................. 340/860; 73/151, 151.5

[56] References Cited

U.S. PATENT DOCUMENTS

| | | | |
|---|---|---|---|
| 3,027,649 | 4/1962 | Sloan | 73/151 |
| 3,372,277 | 3/1968 | Youmans | 340/860 |
| 3,490,149 | 1/1970 | Bowers | 340/860 |
| 3,497,958 | 3/1970 | Gallwitzer | 340/860 |
| 3,552,025 | 1/1971 | Whitfill | 340/860 |
| 3,566,478 | 3/1971 | Hurlston | 73/151 |
| 3,891,038 | 6/1975 | Delestrade et al. | 73/151.5 |
| 4,031,750 | 6/1977 | Youmans et al. | 73/151 |
| 4,041,780 | 8/1977 | Angehrm | 73/151 |
| 4,047,430 | 9/1977 | Angehrm | 73/151 |
| 4,166,500 | 9/1979 | McPhee | 73/151 |

FOREIGN PATENT DOCUMENTS 2119862  8/1972  France ................................. 73/151.5

*Primary Examiner*—Nelson Moskowitz
*Attorney, Agent, or Firm*—Richard M. Byron; Patrick H. McCollum

[57] ABSTRACT

An improved technique is provided for comparing the velocity of an elongated well logging instrument traversing an inclined earth borehole with the playout velocity of the well logging cable at the earth's surface to control both the cable hoist drum rotation and the rate of movement of the subsurface instrument and thus insure cable playout is in equilibrium with the logging instrument movement. Method and apparatus are described for detecting any reduction in movement of the logging instrument through the borehole and for reducing the velocity of the logging cable playout in response thereto by reducing drum rotation. Further, when the velocity of cable playout slows to a preselected value, a monitoring circuit generates control signals which actuate a means of power attached to or integral with the logging instrument which, upon initiation, apply a force to move the logging instrument upward or downward within the borehole.

2 Claims, 2 Drawing Figures

METHOD AND APPARATUS FOR LOGGING INCLINED EARTH BOREHOLES

RELATED APPLICATION

This application is a continuation-in-part of my United States patent application Ser. No. 847,962 filed Nov. 2, 1977 now abandoned for: METHOD AND APPARATUS FOR LOGGING INCLINED EARTH BOREHOLES USING THE MEASURED ACCELERATION OF THE WELL LOGGING INSTRUMENT, which is a continuation-in-part of my U.S. application Ser. No. 838,686 filed Oct. 3, 1977 now U.S. Pat. No. 4,109,521, issued Aug. 29, 1978.

BACKGROUND OF THE INVENTION

This invention relates generally to apparatus for logging earth boreholes and specifically to methods and apparatus utilized to assist well logging instruments in traversing highly deviated earth boreholes.

In the practice of obtaining lithological measurements of subsurface formations there is an attendant problem of moving a logging instrument through an earth borehole, and in particular one which is inclined from the vertical and may contain numerous irregularities and obstructions which impede movement of the instrument to such an extent that it may descend under gravity. In such wells there may also be a comparable problem in retrieving the instrument because it may become stuck, or alternatively, the logging cable becomes stuck. This latter circumstance often occurs when the cable, by its longitudinal movement, "key seats" itself in the mud cake layer which covers the surface of permeable rock formations. In fact the cable may slice into the rock itself, being plastered against the borehole wall by hydraulic forces in the borehole. Often the cable will be broken before sufficient pulling force is applied to cause the cable and attached instrument to move upwardly. In descending, the force of gravity is insufficient to overcome these same effects and the instrument may move discontinuously or become stuck.

In descending, the matter of primary concern is that the bottom of the well or other objective point in the borehole be reached expeditiously with minimum loss of time. Economy of time is important because of the extremely high cost of drilling operations involving slant holes. These in general are drilled from large expensive drilling platforms situated offshore or in hostile and remote locations. Normally the drilling operation is interrupted while logging operations are conducted; so the "rig time" expended while logging may be an important factor in the cost of the overall operations.

As many as 10 to 30 wells are drilled from a single platform, each well directed outwardly from a central vertical hole to form a cluster that uniformly taps the objective reservoir over a preselected area. To control these directionally drilled wells and assure that they reach and penetrate the objective zone often requires more and different types of well logs than conventionally drilled wells. Various prior art methods for traversing such deviated boreholes have been devised.

One such prior art method is called "pump down" logging. This method involves the use of logging instruments which are small in diameter such that they will pass through the drill pipes. With the drilling bit removed, drill pipe is inserted into the hole to a depth above the portion of the hole desired to be logged. At this point, the drill pipe is kept more or less stationary while mud fluids are continuously circulated. The drill pipe is slowly reciprocated longitudinally to avoid its becoming stuck in the hole due to key seating or other hydraulic forces like those discussed previously in respect to the logging cable.

A logging instrument, attached to the conventional logging cable is placed in the top end of the drill pipe and is carried to the bottom by the descending column of mud fluids. The logging cable is meanwhile paid out by the cable winch to allow the tool to descend. When the instrument has reached the bottom of the drill pipe and emerges into the "open" hole, it may fall under gravity or it may become stuck just as in normal operations depending on the conditions of the hole and its inclination. If it becomes stuck, the necessary procedure has been to withdraw the instrument from the hole, add more sections of pipe to the drill pipe string and try again. In some cases it has been found impossible to obtain "open hole" logs of lower portions of steeply inclined boreholes because no satisfactory method was available for overcoming these obstacles. In fact, due to the fact that so much time is consumed in "pump down" logging, with its attendant hight cost, the decision is often made to proceed with a minimum number of logs, or even with none at all. This results in the possible consequence that an unproductive well will result.

A more recent prior art method is the placing of a means of motivating power within the logging instrument itself. A command generated at the surface is used to initiate the motive power to apply force for causing the instrument to move within the borehole. Various methods of accomplishing this are known in the art. An example of such art is disclosed in applicant's above-mentioned U.S. Pat. No. 4,109,521. However, even with motive means within the instrument, problems may occur in causing the instrument to traverse the borehole. For example, if the instrument is being lowered into the borehole and becomes stuck, by the time it is realized at the surface that downward tool movement has stopped and the motive means commanded on, the logging cable may have been played out to overrun the tool and may kink or twist so that when the motive means engages, the cable may be pinched or otherwise damaged. Also, when the instrument together with the lower portion of the cable cease to move, their stuck condition quickly begins to worsen due to continued depositions of mud cake wherever mud filtrate can enter permeable formations. This effect causes the cable and instrument to be more forcefully plastered against the borehole wall and progressively more difficult to disengage. Alternatively, as the instrument is being raised within the borehole, it may become stuck and prior to receipt on the surface of an indication of this condition, the cable may be stretched to an extent which may either snap the cable or at least pull it from its connection with the instrument.

Yet another objectional consequence of discontinuous or non uniform movement of the logging instrument relates to the requirement while logging to produce a record of the logging parameters on a linear depth scale. This is accomplished by a means old in the art whereby the recorder is driven by movement of the sheave wheel over which the cable travels. If the sheave movement is not synchronous with the instrument movement, then the logged parameters will be erroneously recorded with reference to the depth scale. This is particularly prevalent when logging downward in a well, and for this reason in the prior art it is exceptional to undertake a logging operation while going into a well with a logging device. In fact it is sometimes preferred to log while moving downward, as for example when excessively high temperatures are to be encountered. In such case, by logging downward it is possible to obtain a log of the greatest possible portion of the well before the instrument fails. In another case, if the instrument contains a neutron source initiated below a gamma ray measuring device, then radioactivity may be induced in formation elements and detected by the gamma ray measuring device only if the instrument is moving downward. Thus it may be desirable in some cases to log in both directions in order to obtain two differing measurements. In yet another case, a complex instrument may comprise so many measuring devices that it is not practical to perform all the measurements simultaneously. In such case a selected group of measurements may be made going into the hole and the remainder may be made on the way out.

The instant invention, by providng correct correlation between measured parameters and depth in the hole makes is feasable to produce logs of acceptable quality while logging in either direction by overcoming the problems of the prior art due to discontinuous and non uniform drag caused by friction, viscous and hydraulic forces, obstacles in the borehole, and the like.

The present invention overcomes the deficiencies of the prior art and novel means and apparatus are disclosed for providing synchronized cable playout to facilitate movement of the logging instrument within the borehole and for the generation of command signals for initiating a motive force contained within the logging instrument to facilitate movement thereof within the borehole.

SUMMARY OF THE INVENTION

The present invention contemplates a means for determining the rate of movement of the logging instrument and the downward force at the cable head. The latter indicates whether gravitational force on the mass of the instrument is sufficient to overcome friction and other forces tending to prevent movement of the tool. If so, the tool will descend except for the restraining force of the cable. When coming out of the hole, this apparatus will indicate the presence and magnitude of resisting or sticking forces by increases in the indication of weight over and above the actual weight of the tool.

By means of the signal from the accelerometer it is old in the art at the surface to observe changes in the velocity of the tool. By integrating the signal from an axial acceleration measuring device, the velocity of the instrument may be continuously computed whereby the rate at which the cable is wound onto or unwound from the drum may be controlled. This control is in response to the signals received from the subsurface instrument. Drum rotation is monitored and the rotation rate compared with a preselected rotational rate. When cable drum rotation slows to a rate equal to or less than the preselected rate, an electric signal is generated and transmitted to motive means situated in the logging instrument, the signal initiates operation of the motive means to propel the instrument in the desired direction within the well.

It is therefore the primary object of the invention to achieve smooth and expeditious movement of the logging instrument through the borehole.

This and other objects, features and advantages of the present invention will be apparent from the following detailed description taken with reference to the figures of the accompanying drawings, wherein.

DETAILED DESCRIPTION OF THE PREFERRED EMBODIMENT

Figure 1:
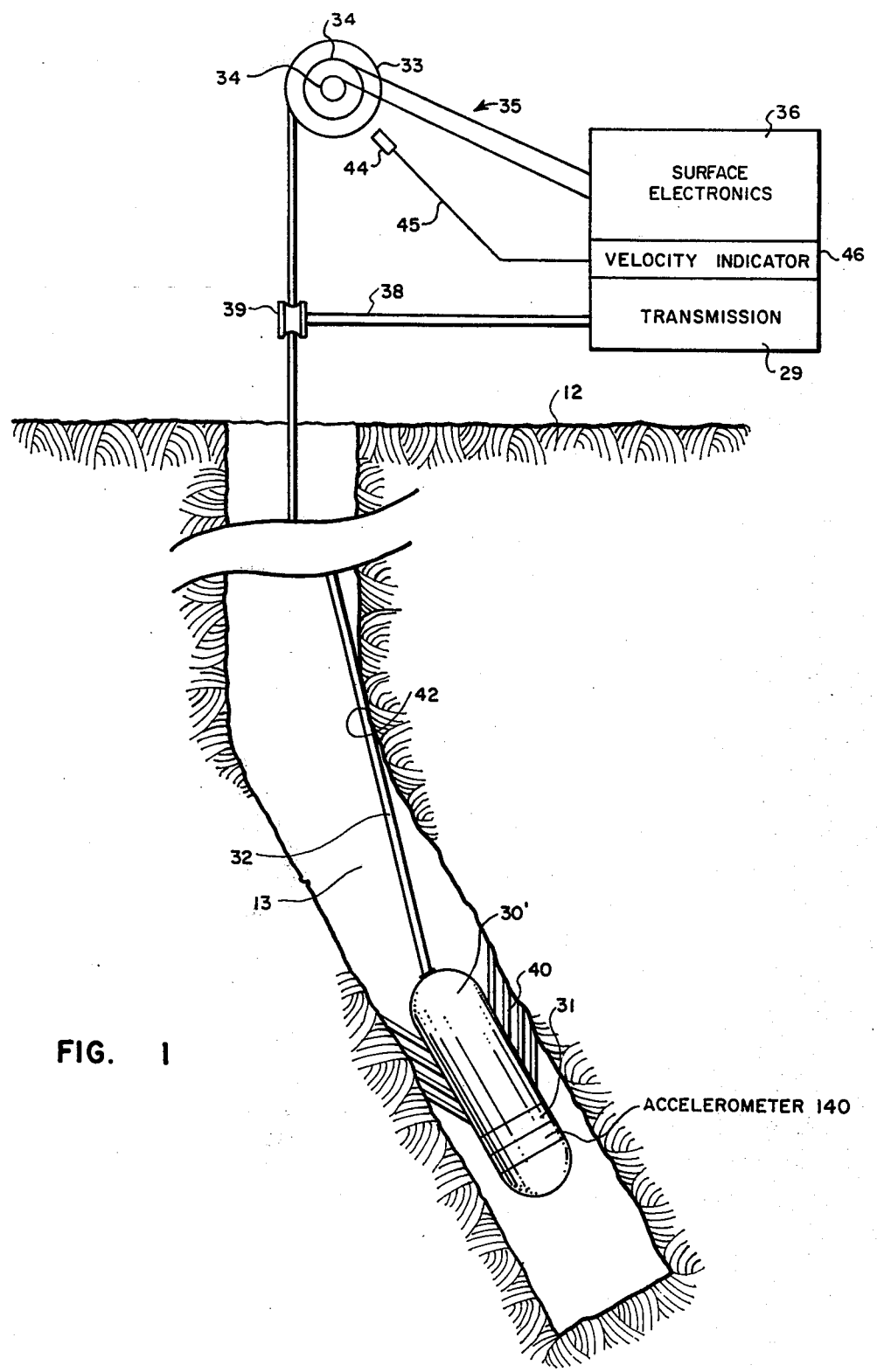
FIG. 1 is a schematic view illustrating the apparatus according to the present invention traversing a deviated earth borehole.

Referring now to the drawing in more detail, and in particular to FIG. 1, there is illustrated schematically a logging operation conducted in accordance with the invention. A well 13, which has been drilled into a portion of the earth's surface 12 has disposed within it a subsurface well logging instrument 30'. Instrument 30' includes a logging module 31 which may be an induction, electric, acoustic or any of the types of conventional logs well known in the art. Cable 32 supports the instrument 30' in the well and contains the required conductors for electrically connecting the instrument 30 with surface apparatus. The cable is wound onto and unwound from cable drum 33 for raising or lowering the instrument 30' to traverse the well. During the traversal, the signals from well logging modules 31 are sent up cable 32. Through slip rings 34 on the end of drum 33, the signals are conducted by the lines indicated generally at 35 to the surface electronics 36. A recorder (not illustrated) within the surface electronics 36 is driven through the transmission 38 by means of measuring reel 39, over which cable 32 is drawn, so that the recorder moves and correlates with depth. Instrument 30' includes an accelerometer 140 for measuring the acceleration of the well logging instrument 30' within the borehole. Additionally, the surface electronics section 36 has incorporated therein a velocity indicator 46 which measures the velocity of either the drum 33 or the cable 32 by means of a sensor 44 which is connected to velocity indicator circuit 46 by means of the conductor 45, the purpose of which will be discussed hereinafter in more detail.

Figure 2:
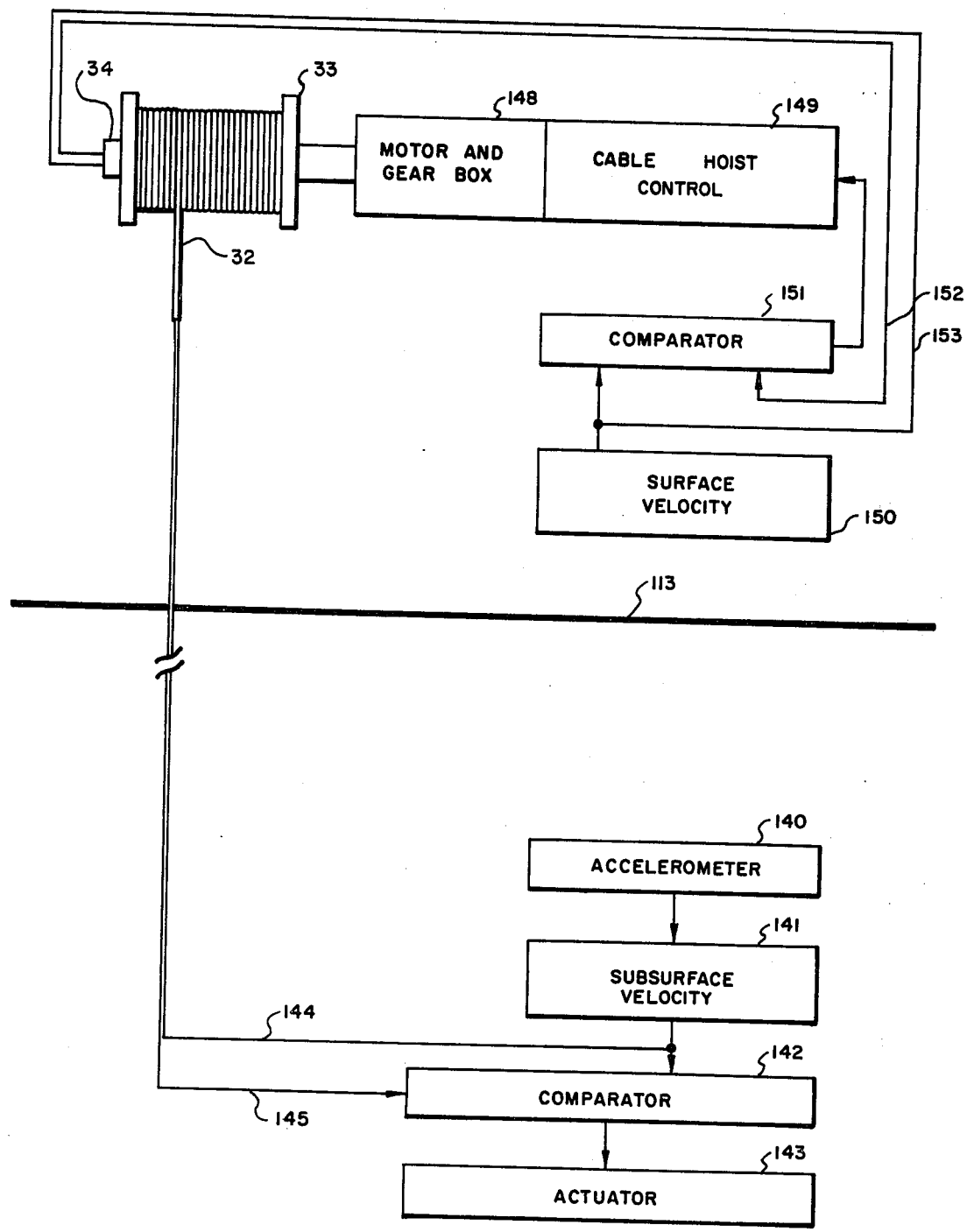
FIG. 2 illustrates schematically, partly in block diagram, comparison and control features of the invention depicted in FIG. 1.

Referring now to FIG. 2, an embodiment of the present invention is described which incorporates a subsurface accelerometer 140 located within the well logging instrument (not illustrated) and which has its output connected to a subsurface velocity circuit 141 whose output in turn is connected to the input of a comparator circuit 142 which drives an actuator 143, for example, the control module for controlling the motive means illustrated in FIG. 1. The output of the subsurface instrument velocity circuit 141 is also connected by means of a conductor 144 located within the well logging cable 146 to the earth's surface. A surface velocity circuit 150 which provides a signal indicative of the velocity of the well logging cable at the surface as hereinbefore described has its output connected to a comparator circuit 151. The surface velocity output signal is also conducted by means of conductor 153 which passes through the slip rings 34 on the end of the hoist drum 33 and is conducted to the subsurface instrument by means of the well logging cable 32 along the conductor 145 to the second input of the comparator circuit 142. The signal which passes along the conductor 144 through the well logging cable 32 is taken off the slip rings 34 and is connected into another input of the surface comparator circuit 151 by means of the conductor 152. The output of the surface comparator circuit 151 is connected into the cable hoist control circuit 149 which drives the motor and gear box 148 which in turn drives the hoist drum 33.

In the operation of the apparatus and circuitry illustrated in FIG. 2, it should be appreciated that as the subsurface accelerometer 140 measures the acceleration of the well logging instrument and which consequently produces a signal indicative of the subsurface velocity through the circuit 141, the subsurface velocity is thus compared with the velocity of the cable at the surface by means of the subsurface comparator 142. Whenever a significant difference is exhibited between the two velocities, the actuator 143 is actuated to thus make, or at least attempt to make, the well logging instrument proceed through the borehole at a greater velocity.

The subsurface velocity of the well logging instrument is also compared with the velocity of the cable at the earth's surface in the surface comparator circuit 151 to control the movement of the hoist drum 33. Thus, if the well logging instrument continues to slow down, even though the actuator 143 has been providing additional motivation for the well logging instrument, the surface comparison circuit 151 will produce a greater output signal which causes a reduction in the rotational movement of the drum 33 and thus will cause the well logging cable to be payed out more slowly. Through the combined apparatus and circuitry illustrated in FIG. 2, the well logging instrument will strive to motivate itself whenever it starts to slow down because of the borehole conditions and even should it start to slow down, despite the activitation of the actuator 143, the cable hoist will also slow down in order to avoid too much cable being paid out. Whenever the instrument starts to speed up, the surface comparator circuit 151 will produce a lesser signal which will in turn cause the hoist drum to speed up and stay with the well logging instrument.

Additionally, there is a strain gauge (not shown) coupled to the cable head which is used to monitor tension caused by weight placed on cable 32 by the subsurface instrument and which develops a signal functionally related thereto which is coupled to surface comparator 151. As hereinafter explained in greater detail, the signal thus derived from the strain gauge is also utilized to develop control and command signals.

Referring now to FIGS. 1 and 2, the instrument 30' is placed into the well at the surface where a section of pipe (not shown) called surface casing is always installed. The instrument 30' will readily descend this cased portion of the hole. The signal from the accelerometer is continuously fed to surface comparator 151 in surface electronics 46 which drives a signal indicative of the instruments downward velocity. The signal from the strain gauge (not shown) at the cable head is also fed continuously to the surface electronics 46. This weight indicating signal and the aforementioned velocity indicating signal are each fed into surface comparator 151 which derives command signals to control the cable winch and the motive power means in the logging instrument.

The surface comparator 151 acts to produce uniform movement of the subsurface instrument downward in the borehole. It will react to changes in either the velocity of the tool or the downward force at the cable head. If, for example, the tool velocity is suddenly diminished but the force at the cable head remains constant, then the tool is not stuck, but some retarding force on the cable is responsible for the reduced speed. The surface comparator's response will be to reduce the rate of rotation of the winch such that is exactly equals the speed of the movement of the downhole tool. If this speed reduction causes the rate of descent to be less than a predetermined minimum, then the surface comparator 151 will actuate the instrument motive power means to attempt to increase tool speed. When the surface comparator 151 senses that an increased downward force is measured at the cable head, the winch speed will be increased. The velocity indicator will then establish whether the tool speed did in fact increase to keep pace with the pay out of of the cable.

In summary of operation, the velocity of the instrument is constantly monitored and the rate of cable pay out is kept equal to tool speed. Whenever tool speed is less than the desired minimum, the means for subsurface motive power is actuated and/or the rate of cable pay out at the winch is increased. If increasing cable pay out does not coincide with an equal increase in tool speed, the winch rate is again reduced.

To assure that the logging cable does not overrun the tool, the length of cable in the hole is measured by conventional means as the cable passes over the sheave. This cable length is compared with the distance the subsurface tool moves as computed in the surface electronics 36 from the data received from the accelerometer 140. The total length of cable in the hole is measured by conventional means as the cable passes over the sheave. This cable length is compared with the distance the subsurface tool moves as computed in the surface electronics 36 from the data received from the subsurface accelerometer 140. The total length of cable payed out should always exceed the depth of the instrument in the hole by a predetermined fraction, e.g., 0.1% to 1.0%, so as to assure that there is sufficient slack line to permit tool movement but insufficient to risk its overrunning the tool.

When the instrument is to be withdrawn from the hole, usually during the logging operation, it will again be desirable to move at a constant predetermined speed. In this case again the computer panel will act to keep the winch take up in synchronism with tool movement. In particular, it will act to stop the winch whenever the tool stops in order to avoid pulling the cable out of the cable head. In the prior art this function has been sometimes achieved by controlling or stopping the winch in response to an indication of weight derived by a weight indicator at the suspended sheave wheel over which the cable travels. It will be appreciated that this method of the prior is inadequate for the reason that such an indication of increased weight due to a tool becoming stuck does not occur until the entire cable has been stretched taut and will thereafter quickly reach the breaking point. By contract the present invention contemplates control of the winch in response to the subsurface signals that are communicated to the surface as soon as the sticking occurs. Thereby the system is enabled to react before any indication is detectable at the sheave and thereby before a dangerous situation can develop.

Thus, there has been illustrated and described herein the preferred embodiment of the present invention which provides method and apparatus for synchronizing cable pay out to movement of the logging instrument through the borehole and for initiating commands to activate motive means contained within the logging instrument to facilitate movement thereof through the borehole. However, those skilled in the art will recognize that obvious modifications can be made to the preferred embodiment without departing from the spirit of the invention.

I claim:

1. A method for logging the formations surrounding an earth borehole, comprising the steps of:

traversing an earth borehole with a well logging instrument connected to a well logging cable wound around a rotatable cable hoist drum at the earth's surface;

generating a signal functionally related to the velocity of said cable at the earth's surface;

generating a signal functionally related to the velocity of said well logging instrument;

comparing said cable velocity signal with said instrument velocity signal and generating a differential signal indicative of the comparison; and controlling the rotation of said cable hoist drum in response to said differential signal for matching said cable velocity to said instrument velocity, generating a signal functionally related to the tension on said well logging cable;

comparing said tension signal with said instrument velocity signal and generating a second differential signal indicative of the comparison, comparing said second differential signal with a preselected threshold signal; and generating a drive signal for initiating motive means contained in said well logging instrument upon the occurrence of said second differential signal exceeding said preselected threshold level in order to assist with displacing a well logging instrument through an earth borehole.

2. Apparatus for logging the formations surrounding an earth borehole, comprising:

a rotatable hoist drum at the earth's surface;

a well logging cable wound around said hoist drum;

an elongated well logging instrument connected to the earth's surface by said well logging cable and adapted to traverse an earth borehole, the pay out of said cable being controlled by the rotation of said hoist drum, means in said instrument for providing an indication of the velocity thereof during traverse of the earth borehole;

means at the earth's surface for providing an indication of the velocity of said well logging cable at the earth's surface;

means for comparing the velocity of said instrument with the velocity of said well logging cable and for generating signals indicative of such comparison; and means interconnected between said means for comparing and for generating and said hoist drum responsive to said generated signals for controlling the rotation of said hoist drum to match the velocities of said logging instrument in said well logging cable means connected to the well logging cable at the earth's surface for detecting the tension placed on said instrument during traversal of the borehole;

means for comparing said tension signal with the velocity of said instrument during traverse of the earth borehole and generating a drive signal indicative of said comparison; and means for comparing said drive signal with an electrical signal having a preselected threshold level for energizing a motive means contained in said logging instrument upon the occurrence of said drive signal exceeding said preselected threshold level in order to assist in displacing said well logging instrument through the borehole.

* * * * *